US012739954B2

(12) United States Patent
Lin et al.

(10) Patent No.: US 12,739,954 B2
(45) Date of Patent: Sep. 15, 2026

(54) CONTROL CIRCUIT FOR ELECTRONIC CIRCUIT

(71) Applicant: Power Forest Technology Corporation, Hsinchu County (TW)

(72) Inventors: Meng Hung Lin, Hsinchu County (TW); Chia-Hsien Liu, Hsinchu County (TW); Rong-Jie Tu, Hsinchu County (TW); Yi-Heng Wu, Hsinchu County (TW)

(73) Assignee: Power Forest Technology Corporation, Hsinchu County (TW)

( * ) Notice: Subject to any disclaimer, the term of this patent is extended or adjusted under 35 U.S.C. 154(b) by 132 days.

(21) Appl. No.: 18/741,791

(22) Filed: Jun. 13, 2024

(65) Prior Publication Data

US 2025/0374399 A1 Dec. 4, 2025

(30) Foreign Application Priority Data

May 31, 2024 (TW) ................................ 113205634

(51) Int. Cl.
*H05B 45/3725* (2020.01)
*H05B 45/14* (2020.01)

(52) U.S. Cl.
CPC ......... *H05B 45/3725* (2020.01); *H05B 45/14* (2020.01)

(58) Field of Classification Search
CPC ........ H05B 45/37; H05B 45/14; H05B 45/30; H05B 45/32; H05B 47/10; H05B 47/105; H05B 47/16; H05B 47/13; H05B 47/14
See application file for complete search history.

(56) References Cited

U.S. PATENT DOCUMENTS

| | | | | |
|---|---|---|---|---|
| 2019/0080127 | A1* | 3/2019 | Yoshida | G06F 3/04162 |
| 2023/0420891 | A1* | 12/2023 | Owen | H04L 43/16 |
| 2024/0072224 | A1* | 2/2024 | Lee | H10H 20/857 |
| 2025/0247936 | A1* | 7/2025 | Veig | H05B 47/20 |

FOREIGN PATENT DOCUMENTS

JP 4132445 B2 * 8/2008

* cited by examiner

*Primary Examiner* — Abdullah A Riyami
*Assistant Examiner* — Syed M Kaiser
(74) *Attorney, Agent, or Firm* — JCIPRNET

(57) ABSTRACT

A control circuit for an electronic circuit is disclosed. The electronic circuit includes a light-emitting element and control pin. The light-emitting element is coupled to the control pin. The control circuit includes a driving circuit and at least one detection circuit. The driving circuit is coupled to the control pin. The driving circuit drives the light-emitting element during a light-emitting period in a driving cycle of the light-emitting element. Each of the at least one detection circuit is coupled to the control pin. The at least one detection circuit receives a voltage value at the control pin during at least one non-light-emitting period in the driving cycle, and provides at least one detection result according to the voltage value of the control pin. The light-emitting element emits light during the light-emitting period and stops emitting light during the at least one non-light-emitting period.

9 Claims, 4 Drawing Sheets

30

CONTROL CIRCUIT FOR ELECTRONIC CIRCUIT

CROSS-REFERENCE TO RELATED APPLICATION

This application claims the priority benefit of Taiwan application serial no. 113205634, filed on May 31, 2024. The entirety of the above-mentioned patent application is hereby incorporated by reference herein and made a part of this specification.

BACKGROUND

Technical Field

This disclosure relates to a control circuit for an electronic circuit, in particular to a control circuit with a low pin count.

Description of Related Art

In general, control circuits can be used to control the operation of electronic circuits and to detect circuit characteristics of electronic circuits. The control circuit provides operation according to the circuit characteristics of the electronic circuit, such as over-temperature protection or over-current protection. The control circuit controls the operation of the electronic circuit through the control pins and detects the different circuit characteristics of the electronic circuit through multiple detection pins.

However, due to the small size requirement, the quantity of pins between the electronic circuit and the control circuit needs to be reduced. How to provide a control circuit with a low pin count may be one of the research focuses of those skilled in the art.

SUMMARY

The disclosure provides a control circuit with a low pin count.

In an embodiment of the disclosure, the control circuit is used for an electronic circuit. The electronic circuit includes a light-emitting element and a control pin. The light-emitting element is coupled to the control pin. The control circuit includes a driving circuit and at least one detection circuit. The driving circuit is coupled to the control pin. The driving circuit drives the light-emitting element during a light-emitting period in a driving cycle of the light-emitting element. The at least one detection circuit is each coupled to a control pin. The at least one detection circuit receives a voltage value at the control pin during at least one non-light-emitting period in the driving cycle, and provides at least one detection result according to the voltage value of the control pin. The light-emitting element emits light during the light-emitting period and stops emitting light during the at least one non-light-emitting period.

In an embodiment of the disclosure, the electronic circuit further includes a thermistor and a sensing resistor. The light-emitting element is coupled between the control pin and a connection node. The thermistor is coupled between the control pin and the connection node. The sensing resistor is coupled between the connection node and a reference low voltage. The at least one detection circuit includes a first detection circuit and a second detection circuit. The first detection circuit is coupled to the control pin. The first detection circuit generates a temperature detection signal according to a resistance value of the thermistor during a first non-light-emitting period in the driving cycle. The second detection circuit is coupled to the control pin. The second detection circuit detects a current value flowing through the sensing resistor during a second non-light-emitting period in the driving cycle.

In an embodiment of the disclosure, the control circuit further includes a controller. The controller is coupled to the driving circuit, the first detection circuit, and the second detection circuit. The controller provides a first control signal to the driving circuit during the light-emitting period, provides a second control signal to the first detection circuit during the first non-light-emitting period, and provides a third control signal to the second detection circuit during the second non-light-emitting period. The driving circuit provides a driving power to drive the light-emitting element in response to the first control signal. The first detection circuit detects the resistance value of the thermistor through the control pin in response to the second control signal. The second detection circuit detects the current value flowing through the sensing resistor through the control pin in response to the third control signal.

In an embodiment of the disclosure, the driving circuit includes a first switch. A first end of the first switch is coupled to the driving power. A second end of the first switch is coupled to the control pin. A control end of the first switch is coupled to the controller.

In an embodiment of the disclosure, the first switch is turned on during the light-emitting period to provide the driving power to the control pin, and is turned off during the first non-light-emitting period and the second non-light-emitting period.

In an embodiment of the disclosure, the first detection circuit includes a detection signal generating circuit and a second switch. The detection signal generating circuit is coupled to the controller. A first end of the second switch is coupled to the detection signal generating circuit. A second end of the second switch is coupled to the control pin. A control end of the second switch is coupled to the controller. The second switch is turned on during the first non-light-emitting period to connect the detection signal generating circuit to the control pin, and is turned off during the light-emitting period and the second non-light-emitting period. The detection signal generating circuit generates the temperature detection signal during the first non-light-emitting period and provides the temperature detection signal to the controller.

In an embodiment of the disclosure, the detection signal generating circuit includes a current source circuit, a first transistor, a first buffer, a second buffer, and a resistor. The current source circuit is coupled to a first node and a second node. A first end of the first transistor is coupled to the first node. A second end of the first transistor is coupled to the second end of the second switch. A first input end of the first buffer receives a reference voltage. A second input end of the first buffer is coupled to the second end of the second switch. An output end of the first buffer is coupled to a control end of the first transistor. A first input end of the second buffer is coupled to the second node. A second input end of the second buffer is coupled to an output end of the second buffer and the controller. The resistor is coupled between the second node and the reference low voltage.

In an embodiment of the disclosure, the current source circuit includes a second transistor and a third transistor. A first end of the second transistor is coupled to a reference high voltage. A second end of the second transistor is coupled to a control end of the second transistor and the first node. A first end of the third transistor is coupled to the reference high voltage. A second end of the third transistor is coupled to the second node. A control end of the third transistor is coupled to the control end of the second transistor.

In an embodiment of the disclosure, the second detection circuit includes a third switch and a sampling circuit. A first end of the third switch is coupled to the control pin. A control end of the third switch is coupled to the controller. The sampling circuit is coupled to a second end of the third switch and the controller. The third switch is turned on during the second non-light-emitting period to connect the sampling circuit to the control pin, and is turned off during the light-emitting period and the first non-light-emitting period. The sampling circuit receives the voltage value at the control pin during the second non-light-emitting period, and detects the current value flowing through the sensing resistor according to the voltage value at the control pin.

In an embodiment of the disclosure, the second detection circuit further includes an amplifier. The amplifier is coupled between the second end of the third switch and the sampling circuit. The amplifier amplifies the voltage value at the control pin during the second non-light-emitting period.

Based on the above, the control circuit may drive the light-emitting element through a single control pin and provide the detection result according to the voltage value of the control pin. The control circuit does not need to use additional detection pins to provide the detection result. In this way, the size of the control circuit and the size of the electronic circuit may be reduced.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1:
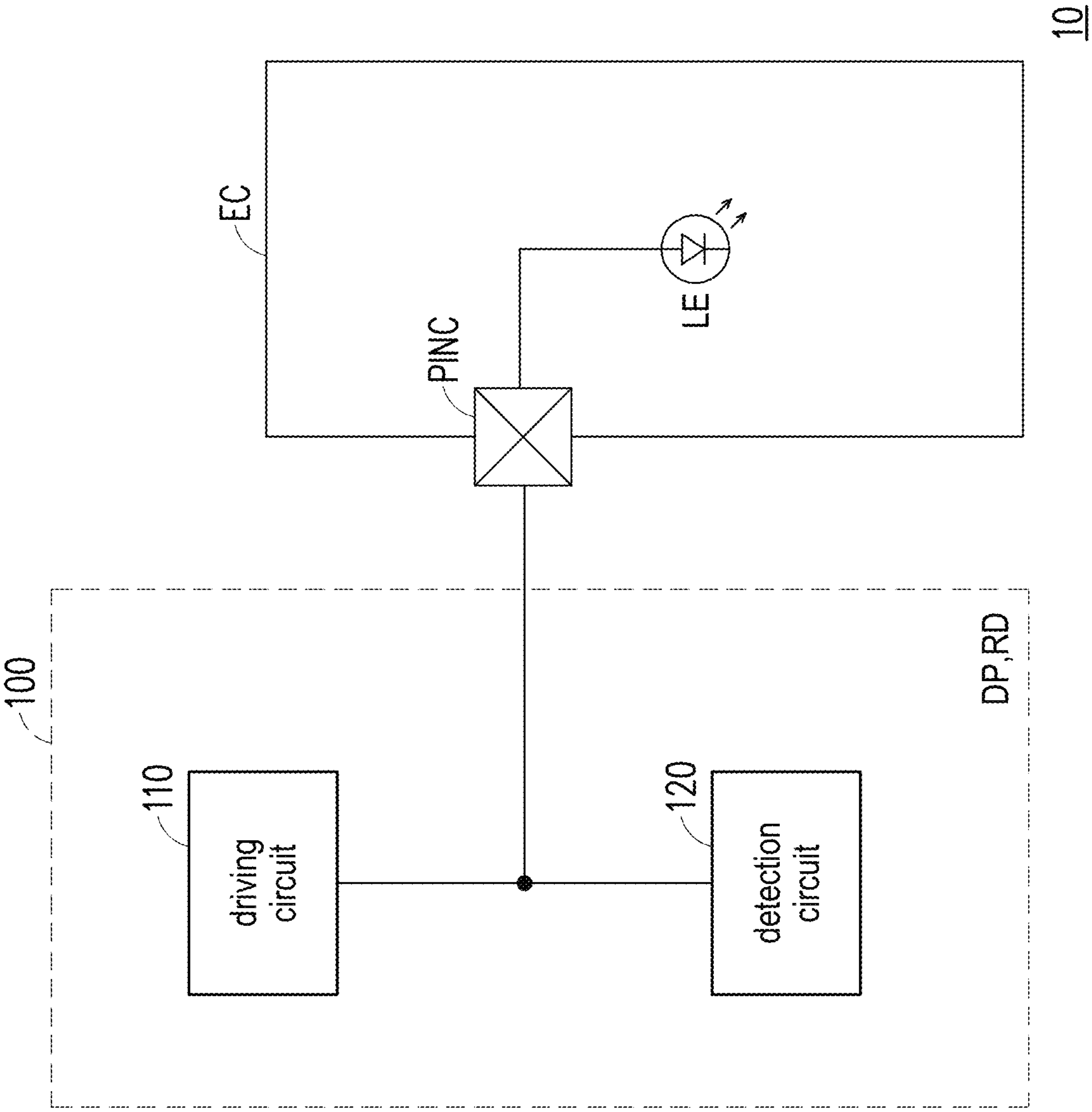
FIG. 1 is a schematic diagram of an electronic device according to an embodiment of the disclosure.

Some embodiments of the disclosure are described in detail below with reference to the accompanying drawings. The reference numerals cited in the following description are regarded as the same or similar elements when the same reference numerals appear in different drawings. The embodiments are only part of the disclosure and do not disclose all possible implementations of the disclosure. Rather, the embodiments are merely examples within the scope of the claims of the disclosure.

Referring to FIG. 1, FIG. 1 is a schematic diagram of an electronic device according to an embodiment of the disclosure. In this embodiment, an electronic device 10 includes a control circuit 100 and an electronic circuit EC. The electronic circuit EC includes a light-emitting element LE and a control pin PINC. The light-emitting element LE is coupled to the control pin PINC. In this embodiment, the light-emitting element LE may be a circuit including at least one light-emitting diode in any form, but the disclosure is not limited to this embodiment. The control pin PINC may be a pad or an electrical connection structure, but the disclosure is not limited to this embodiment. The electronic circuit EC may be a functional circuit in an electronic device. For example, the electronic circuit EC may be any type of power converter or chip, but the disclosure is not limited thereto.

In this embodiment, the control circuit 100 includes a driving circuit 110 and a detection circuit 120. The driving circuit 110 is coupled to the control pin PINC. The driving circuit 110 drives the light-emitting element LE during a light-emitting period in a driving cycle DP. The detection circuit 120 is coupled to the control pin PINC. The detection circuit 120 receives a voltage value at the control pin PINC during a non-light-emitting period in the driving cycle DP, and provides a detection result RD according to the voltage value of the control pin PINC. In this embodiment, the light-emitting element LE may operate based on the driving cycle DP. The light-emitting element LE emits light during the light-emitting period and stops emitting light during the non-light-emitting period.

In this embodiment, providing the detection result RD may be, for example, one of a load current associated with the electronic circuit EC and a temperature of the electronic circuit EC.

It should be noted that based on the driving cycle DP, the control circuit 100 may drive the light-emitting element LE through the control pin PINC. In addition, the control circuit 100 may receive the voltage value at the control pin PINC during the non-light-emitting period in the driving cycle DP, and provide the detection result RD according to the voltage value of the control pin PINC. The control circuit 100 may drive the light-emitting element LE through a single control pin PINC and provide the detection result RD according to the voltage value of the control pin PINC. The control circuit 100 does not need to use additional detection pins to provide the detection result RD. In this way, a size of the control circuit 100 and a size of the electronic circuit EC may be reduced.

In this embodiment, a duty cycle used to drive the light-emitting element LE may be determined by a length of the light-emitting period and a length of the non-light-emitting period.

The control circuit 100 in this embodiment includes a single detection circuit 120 as an example. However, the disclosure is not limited thereto. In some embodiments, the control circuit 100 may include multiple detection circuits for detecting different circuit characteristics of the electronic circuit EC.

Figure 2:
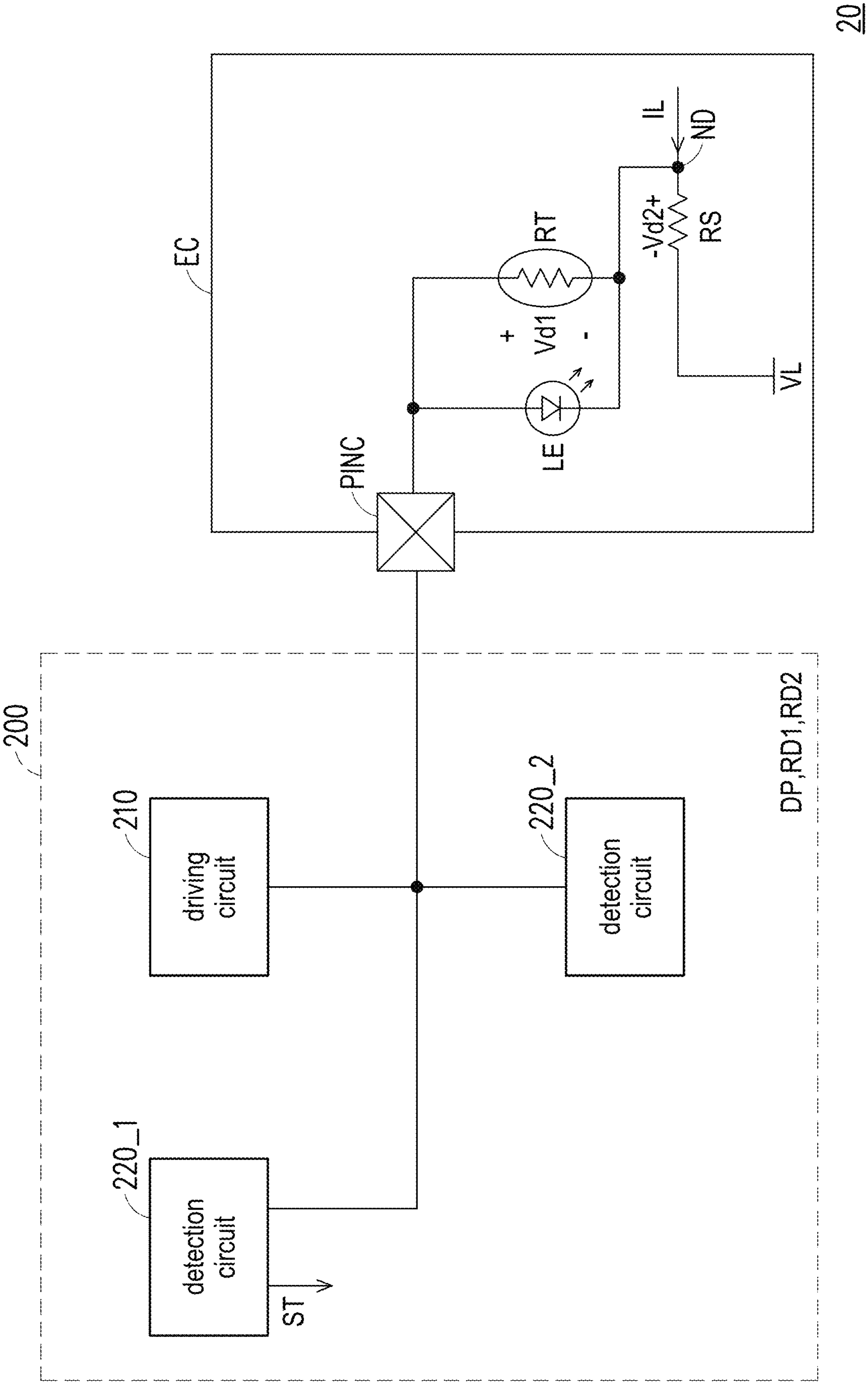
FIG. 2 is a schematic diagram of an electronic device according to an embodiment of the disclosure.

Referring to FIG. 2, FIG. 2 is a schematic diagram of an electronic device according to an embodiment of the disclosure. In this embodiment, an electronic device 20 includes a control circuit 200 and an electronic circuit EC. The electronic circuit EC includes a light-emitting element LE, thermistor RT, a sensing resistor RS, and a control pin PINC. The light-emitting element LE is coupled between the control pin PINC and a connection node ND. The thermistor RT is coupled between the control pin PINC and the connection node ND. The sensing resistor RS is coupled between the connection node ND and a reference low voltage VL (for example, ground).

In this embodiment, the control circuit 200 includes a driving circuit 210 and detection circuits 220_1 and 220_2. The driving circuit 210 is coupled to the control pin PINC.

The driving circuit 210 drives the light-emitting element LE during the light-emitting period in the driving cycle DP.

The detection circuit 220_1 is coupled to the control pin PINC. The detection circuit 220_1 generates a temperature detection signal ST according to a resistance value of the thermistor RT during a first non-light-emitting period in the driving cycle DP. For example, during the first non-light-emitting period, the detection circuit 220_1 may obtain a voltage difference Vd1 between two ends of the thermistor RT through the control pin PINC, and provide a sensed current value according to the voltage difference Vd1 between the two ends of the thermistor RT. Thus, during the first non-light-emitting period, the control circuit 200 may generate the temperature detection signal ST according to the sensed current value. The temperature detection signal ST may be a detection result RD1. The temperature detection signal ST is related to a temperature of the electronic circuit EC during operation. The control circuit 200 may use the temperature detection signal ST to perform over-temperature protection of the electronic circuit EC.

The detection circuit 220_2 is coupled to the control pin PINC. The detection circuit 220_2 detects a current value flowing through the sensing resistor RS during a second non-light-emitting period in the driving cycle DP. In this embodiment, during the second non-light-emitting period, the control circuit 200 does not provide signals or power to the control pin PINC. The voltage value at the control pin PINC is roughly equal to a voltage difference Vd2 between two ends of the sensing resistor RS. Thus, the detection circuit 220_2 may obtain the voltage difference Vd2 between the two ends of the sensing resistor RS through the control pin PINC, and obtain the current value flowing through the sensing resistor RS according to the voltage difference Vd2 between the two ends of the sensing resistor RS. In the electronic circuit EC, the current value flowing through the sensing resistor RS is equal to a current value of a load current IL flowing into the connection node ND. In other words, the detection circuit 220_2 may obtain the current value of the load current IL according to the voltage difference Vd2 between the two ends of the sensing resistor RS and a resistance value of the sensing resistor RS. The current value of the load current IL may be another detection result RD2. During the second non-light-emitting period, the control circuit 200 may use the voltage value at the control pin PINC to perform over-current protection of the electronic circuit EC.

In this embodiment, the controller 230 is, for example, a central processing unit (CPU), or other programmable general-purpose or special-purpose microprocessor, digital signal processor (DSP), programmable controller, application specific integrated circuits (ASIC), programmable logic device (PLD), or other similar devices or combinations of these devices, which may be loaded and execute computer programs.

In some embodiments, one of the detection circuits 220_1 and 220_2 may be omitted.

Figure 3:
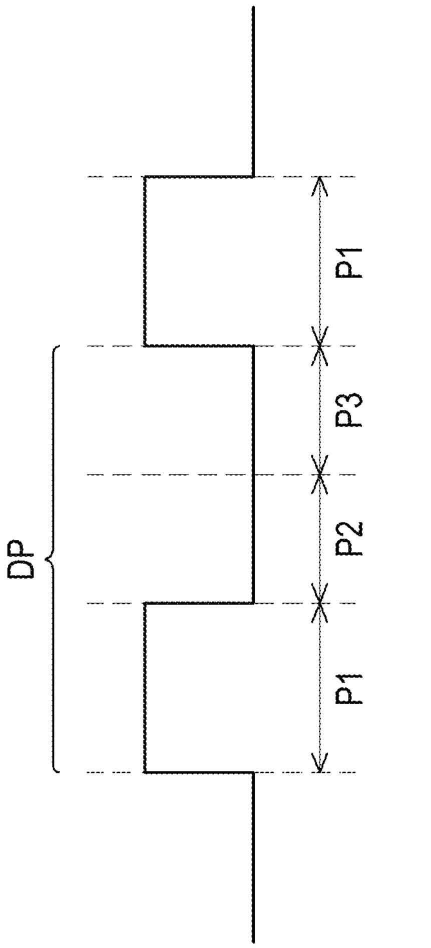
FIG. 3 is a driving timing diagram of a light-emitting element according to an embodiment of the disclosure.

Referring to FIG. 2 and FIG. 3, FIG. 3 is a driving timing diagram of a light-emitting element according to an embodiment of the disclosure. FIG. 3 shows the driving cycle DP for the light-emitting element LE. In this embodiment, the driving cycle DP includes a light-emitting period P1, a first non-light-emitting period P2, and a second non-light-emitting period P3. For example, in this embodiment, the first non-light-emitting period P2 is after the light-emitting period P1. The second non-light-emitting period P3 is after the first non-light-emitting period P2. The light-emitting period P1 of the next driving cycle DP is after the second non-light-emitting period P3, and so on.

In some embodiments, the second non-light-emitting period P3 is after the light-emitting period P1. The first non-light-emitting period P2 is after the second non-light-emitting period P3. The light-emitting period P1 of the next driving cycle DP is after the first non-light-emitting period P2, and so on.

In this embodiment, a ratio of a time length of the light-emitting period P1 to the driving cycle DP may determine a duty cycle for driving the light-emitting element LE. For example, the proportion of the time length of the light-emitting period P1 in the driving cycle DP is equal to 50%. In other words, the time length of the light-emitting period P1 is equal to a sum of the time length of the first non-light-emitting period P2 and the second non-light-emitting period P3. Thus, the duty cycle is equal to 50%. For example, the proportion of the time length of the light-emitting period P1 in the driving cycle DP is equal to 90%. The proportion of the sum of the time length of the first non-light-emitting period P2 and the second non-light-emitting period P3 in the driving cycle DP is equal to 10%. Thus, the duty cycle is equal to 90%.

Figure 4:
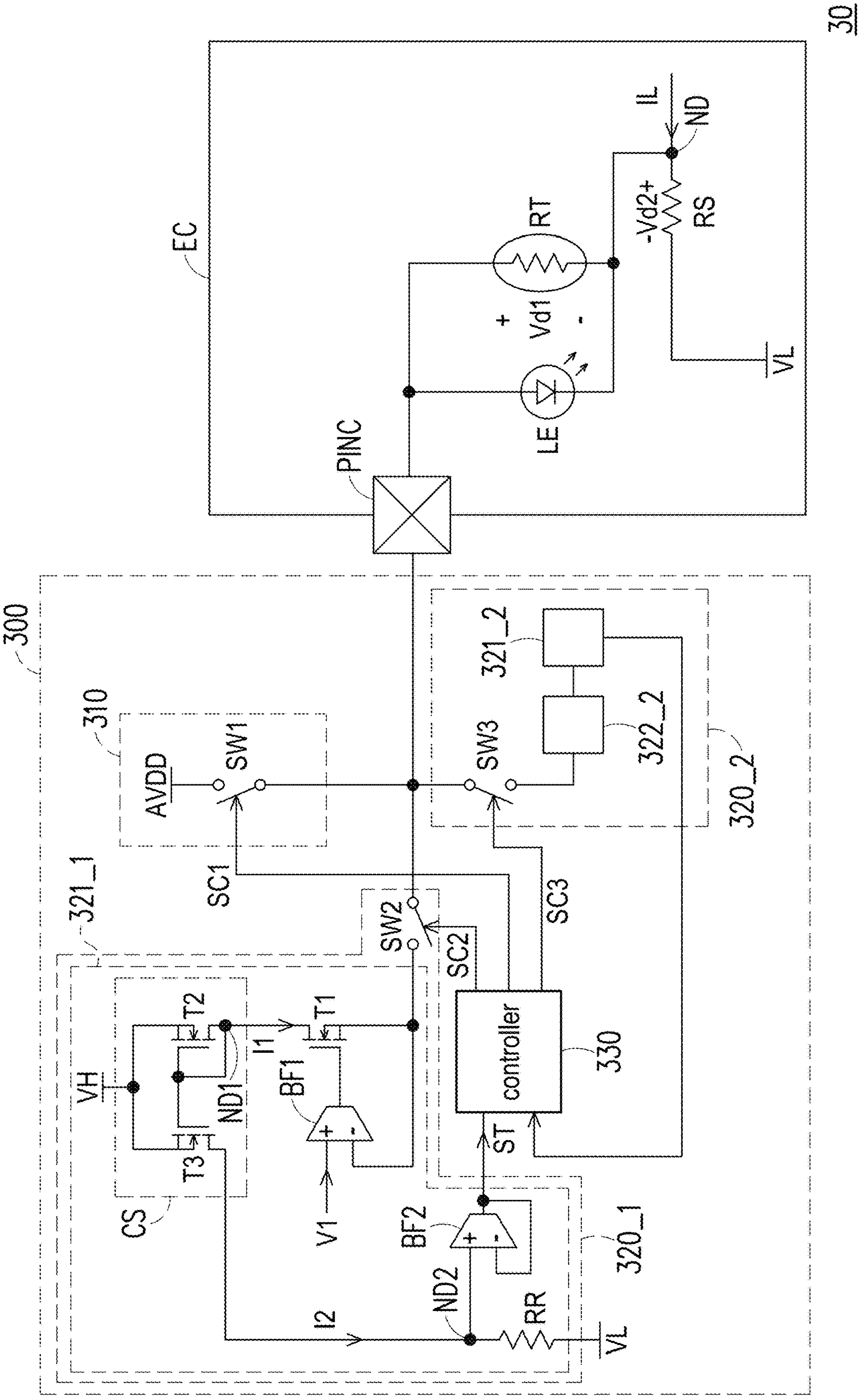
FIG. 4 is a schematic diagram of an electronic device according to an embodiment of the disclosure.

Referring to FIG. 3 and FIG. 4, FIG. 4 is a schematic diagram of an electronic device according to an embodiment of the disclosure. In this embodiment, an electronic device 30 includes a control circuit 300 and an electronic circuit EC. The electronic circuit EC includes a light-emitting element LE, a thermistor RT, a sensing resistor RS, and a control pin PINC. The light-emitting element LE is coupled between the control pin PINC and a connection node ND. The thermistor RT is coupled between the control pin PINC and the connection node ND. The sensing resistor RS is coupled between the connection node ND and a reference low voltage VL (for example, ground).

In this embodiment, the control circuit 300 includes a driving circuit 310, detection circuits 320_1 and 320_2, and a controller 330. The driving circuit 310 is coupled to the control pin PINC. The driving circuit 310 drives the light-emitting element LE in a light-emitting period P1 in a driving cycle DP.

The detection circuit 320_1 is coupled to the control pin PINC. The detection circuit 320_1 generates a temperature detection signal ST according to a resistance value of the thermistor RT during a first non-light-emitting period P2 in the driving cycle DP. The detection circuit 320_2 is coupled to the control pin PINC. The detection circuit 320_2 detects a current value flowing through the sensing resistor RS in a second non-light-emitting period P3 in the driving cycle DP.

In this embodiment, the controller 330 is coupled to the driving circuit 310 and the detection circuits 320_1 and 320_2. The controller 330 provides a first control signal SC1 to the driving circuit 310 during the light-emitting period P1, provides a second control signal SC2 to the detection circuit 320_1 during the first non-light-emitting period P2, and provides a third control signal SC3 to the detection circuit 320_2 during the second non-light-emitting period P3. In response to the first control signal SC1, the driving circuit 310 provides a driving power AVDD to drive the light-emitting element LE. In response to the second control signal SC2, the detection circuit 320_1 detects the resistance value of the thermistor RT through the control pin PINC. In response to the third control signal SC3, the detection circuit 320_2 detects the current value flowing through the sensing resistor RS through the control pin PINC.

In this embodiment, the driving circuit 310 includes a first switch SW1. A first end of the first switch SW1 is coupled to the driving power AVDD. A second end of the first switch SW1 is coupled to the control pin PINC. A control end of the first switch SW1 is coupled to the controller 330.

During the light-emitting period P1, the control end of the first switch SW1 receives the first control signal SC1 from the controller 330. Thus, the first switch SW1 is turned on during the light-emitting period P1 to provide the driving power AVDD to the control pin PINC. Thus, in the light-emitting period P1, the light-emitting element LE is driven to emit light. In addition, during the first non-light-emitting period P2 and the second non-light-emitting period P3, the first switch SW1 does not receive the first control signal SC1. Thus, the first switch SW1 is turned off during the first non-light-emitting period P2 and the second non-light-emitting period P3.

In this embodiment, the detection circuit 320_1 includes a detection signal generating circuit 321_1 and a second switch SW2. The detection signal generating circuit 321_1 is coupled to the controller 330. A first end of the second switch SW2 is coupled to the detection signal generating circuit 321_1. A second end of the second switch SW2 is coupled to the control pin PINC. A control end of the second switch SW2 is coupled to the controller 330.

During the first non-light-emitting period P2, the control end of the second switch SW2 receives the second control signal SC2 from the controller 330. Thus, the second switch SW2 is turned on to connect the detection signal generating circuit 321_1 to the control pin PINC. The detection signal generation circuit 321_1 generates the temperature detection signal ST during the first non-light-emitting period P2, and provides the temperature detection signal ST to the controller 330. During the light-emitting period P1 and the second non-light-emitting period P3, the second switch SW2 does not receive the second control signal SC2. Thus, the second switch SW2 is turned off. The detection signal generating circuit 321_1 does not operate.

In this embodiment, the detection signal generating circuit 321_1 includes a current source circuit CS, a transistor T1, buffers BF1 and BF2, and a resistor RR. The current source circuit CS is coupled to a first node ND1 and a second node ND2. A first end of the transistor T1 is coupled to the first node ND1. A second end of the transistor T1 is coupled to the second end of the second switch SW2. A first input end of the buffer BF1 receives a reference voltage V1. A second input end of the buffer BF1 is coupled to the second end of the second switch SW2. An output end of the buffer BF1 is coupled to a control end of the transistor T1. A first input end of the buffer BF2 is coupled to the second node ND2. A second input end of the buffer BF2 is coupled to an output end of the buffer BF2 and the controller 330. The output end of the buffer BF2 is used to output the temperature detection signal ST. The resistor RR is coupled between the second node ND2 and the reference low voltage VL.

In this embodiment, the current source circuit CS includes transistors T2 and T3. A first end of the transistor T2 is coupled to a reference high voltage VH. A second end of the transistor T2 is coupled to a control end of the transistor T2 and the first node ND1. A first end of the transistor T3 is coupled to the reference high voltage VH. A second end of the transistor T3 is coupled to the second node ND2. A control end of the transistor T3 is coupled to the control end of the transistor T2. The transistors T2 and T3 are N-type transistors respectively, but this disclosure is not limited thereto.

For example, a voltage value of the reference voltage V1 is equal to 1 volt, but the disclosure is not limited thereto. The first input end of the buffer BF1 may be a non-inverting input end. The second input end of buffer BF1 may be an inverting input end. The transistor T1 is an N-type transistor. Thus, the buffer BF1 and the transistor T1 form a low-dropout regulator (LDO) circuit. In addition, during the first non-light-emitting period P2, the second switch SW2 is turned on. The current source circuit CS, the thermistor RT, and the sensing resistor RS together form a current mirror circuit. Thus, the current value of the current I1 flowing through the first node ND1, the transistor T1, the thermistor RT, and the sensing resistor RS is proportional to the current value of the current I2 flowing through the second node ND2 and the resistor RR.

For example, the thermistor RT has a negative temperature coefficient (NTC). When the temperature of the electronic circuit EC decreases, the resistance value of the thermistor RT is increased. The current value of the current I1 is reduced. The current value of the current I2 is reduced. A voltage value at the second node ND2 is reduced. Thus, a voltage value of the temperature detection signal ST is reduced.

When the temperature of the electronic circuit EC increases, the resistance value of the thermistor RT is reduced. The current value of the current I1 is increased. The current value of the current I2 is increased. The voltage value at second node ND2 is increased. Thus, the voltage value of the temperature detection signal ST is increased. The controller 330 may perform the over-temperature protection operation of the electronic circuit EC according to the voltage value of the temperature detection signal ST.

In this embodiment, the detection circuit 320_2 includes a third switch SW3 and a sampling circuit 321_2. A first end of the third switch SW3 is coupled to the control pin PINC. A control end of the third switch SW3 is coupled to the controller 330. The sampling circuit 321_2 is coupled to a second end of the third switch SW3 and the controller 330.

During the second non-light-emitting period P3, a control end of the third switch SW3 receives the third control signal SC3 from the controller 330. Thus, the third switch SW3 is turned on during the second non-light-emitting period P3 to connect the sampling circuit 321_2 to the control pin PINC. During the light-emitting period P1 and the first non-light-emitting period P2, the control end of the third switch SW3 does not receive the third control signal SC3. Thus, the third switch SW3 is turned off.

In this embodiment, the sampling circuit 321_2 receives the voltage value at the control pin PINC during the second non-light-emitting period P3, and detects the current value flowing through the sensing resistor RS according to the voltage value at the control pin PINC. It should be noted that during the second non-light-emitting period P3, the control circuit 300 does not provide signals or power to the control pin PINC. The voltage value at the control pin PINC is approximately equal to the voltage difference Vd2 between the two ends of the sensing resistor RS (i.e., the voltage value at the connection node ND). The value of the current flowing through the sensing resistor RS is equal to the current value of the load current IL flowing into the connection node ND. Thus, during the second non-light-emitting period P3, the controller 330 obtains the current value of the load current IL connected to the node ND according to the voltage value at the control pin PINC and the resistance value of the sensing resistor RS. During the second non-light-emitting period P3, the controller 330 may use the voltage value at the control pin PINC to perform over-current protection.

In addition, the sampling circuit 321_2 may also save data of the voltage value at the control pin PINC received during the second non-light-emitting period P3. The data stored in the sampling circuit 321_2 is related to the voltage difference Vd2 between the two ends of the sensing resistor RS. The controller 330 receives the data during the second non-light-emitting period P3 for over-current protection, and uses the data during the first non-light-emitting period P2 to obtain the voltage difference Vd1 between the two ends of the thermistor RT. Furthermore, the controller 330 may obtain the current value of the current I2 according to the voltage value of the temperature detection signal ST and the resistance value of the resistor RR. The controller 330 may obtain the current value of the current I1 according to the current value of the current I2, and obtain the voltage value at the control pin PINC during the first non-light-emitting period P2 according to the current value of the current I1. During the first non-light-emitting period P2, the controller 330 subtracts the voltage difference Vd2 from the voltage value at the control pin PINC to obtain the voltage difference Vd1 between the two ends of the thermistor RT. Thus, the controller 330 may obtain the resistance value of the thermistor RT according to the current value of the current I1 and the voltage difference Vd1 between the two ends of the thermistor RT. The controller 330 obtains the temperature of the electronic circuit EC according to the resistance value of the thermistor RT. In this way, the data stored in the sampling circuit 321_2 helps to improve the accuracy of the controller 330 in determining the temperature of the electronic circuit EC.

In this embodiment, the detection circuit 320_2 also includes an amplifier 322_2. The amplifier 322_2 is coupled between the second end of the third switch SW3 and the sampling circuit 321_2. The amplifier 322_2 amplifies the voltage value at the control pin PINC during the second non-light-emitting period P3. For example, the resistance value of the sensing resistor RS is low. The resistance value of the sensing resistor RS is, for example, 5 milliohms, but the disclosure is not limited thereto. Thus, during the second non-light-emitting period P3, the voltage value at the control pin PINC may be very small. The controller 330 may misjudge or ignore the voltage value due to the very small voltage value. During the second non-light-emitting period P3, the amplifier 322_2 may amplify the voltage value at the control pin PINC to generate a detection result (e.g., the detection result RD2 as shown in FIG. 2). Thus, the controller 330 does not misjudge or ignore the voltage value at the control pin PINC. The controller 330 may know an amplification factor of the amplifier 322_2. When receiving the detection result from the sampling circuit 321_2, the controller 330 may restore the data from the detection result of the sampling circuit 321_2 to the voltage value at the control pin PINC according to the amplification factor of the amplifier 322_2. In this way, the controller 330 may still provide accurate over-current protection.

In this embodiment, the amplifier 322_2 may be provided by an analog-to-digital converter (ADC) or a circuit including an operational amplifier.

To sum up, the control circuit is connected to the electronic circuit through a single control pin. The control circuit may drive the light-emitting element through a single control pin and provide at least one detection result according to the voltage value of the control pin. The control circuit does not need to use additional detection pins to provide the detection result of the electronic circuit. In this way, the size of the control circuit and the size of the electronic circuit may be reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control circuit for an electronic circuit, wherein the electronic circuit comprises a light-emitting element and a control pin, wherein the light-emitting element is coupled to the control pin, wherein the control circuit comprises:

a driving circuit, coupled to the control pin, configured to drive the light-emitting element during a light-emitting period in a driving cycle of the light-emitting element; and at least one detection circuit, each coupled to the control pin, configured to receive a voltage value at the control pin during at least one non-light-emitting period in the driving cycle, and provide at least one detection result according to the voltage value of the control pin, wherein the light-emitting element emits light during the light-emitting period and stops emitting light during the at least one non-light-emitting period, wherein the electronic circuit further comprises a thermistor and a sensing resistor, wherein the light-emitting element is coupled between the control pin and a connection node, wherein the thermistor is coupled between the control pin and the connection node, wherein the sensing resistor is coupled between the connection node and a reference low voltage, and wherein the at least one detection circuit comprises:

a first detection circuit, coupled to the control pin, configured to generate a temperature detection signal according to a resistance value of the thermistor during a first non-light-emitting period in the driving cycle; and a second detection circuit, coupled to the control pin, configured to detect a current value flowing through the sensing resistor during a second non-light-emitting period in the driving cycle.

2. The control circuit according to claim 1 further comprising:

a controller, coupled to the driving circuit, the first detection circuit, and the second detection circuit, configured to provide a first control signal to the driving circuit during the light-emitting period, provide a second control signal to the first detection circuit during the first non-light-emitting period, and provide a third control signal to the second detection circuit during the second non-light-emitting period, wherein the driving circuit provides a driving power to drive the light-emitting element in response to the first control signal, wherein the first detection circuit detects the resistance value of the thermistor through the control pin in response to the second control signal, and wherein the second detection circuit detects the current value flowing through the sensing resistor through the control pin in response to the third control signal.

3. The control circuit according to claim 2, wherein the driving circuit comprises:

a first switch, a first end of the first switch being coupled to the driving power, a second end of the first switch being coupled to the control pin, and a control end of the first switch being coupled to the controller.

4. The control circuit according to claim 3, wherein the first switch is turned on during the light-emitting period to provide the driving power to the control pin, and is turned off during the first non-light-emitting period and the second non-light-emitting period.

5. The control circuit according to claim 2, wherein the first detection circuit comprises:

a detection signal generating circuit, coupled to the controller; and a second switch, a first end of the second switch being coupled to the detection signal generating circuit, a second end of the second switch being coupled to the control pin, and a control end of the second switch being coupled to the controller, wherein the second switch is turned on during the first non-light-emitting period to connect the detection signal generating circuit to the control pin, and is turned off during the light-emitting period and the second non-light-emitting period, and wherein the detection signal generating circuit generates the temperature detection signal during the first non-light-emitting period and provides the temperature detection signal to the controller.

6. The control circuit according to claim 5, wherein the detection signal generating circuit comprises:

a current source circuit, coupled to a first node and a second node;

a first transistor, a first end of the first transistor being coupled to the first node, and a second end of the first transistor being coupled to the second end of the second switch;

a first buffer, a first input end of the first buffer receiving a reference voltage, a second input end of the first buffer being coupled to the second end of the second switch, and an output end of the first buffer being coupled to a control end of the first transistor;

a second buffer, a first input end of the second buffer being coupled to the second node, a second input end of the second buffer being coupled to an output end of the second buffer and the controller; and a resistor, coupled between the second node and the reference low voltage.

7. The control circuit according to claim 6, wherein the current source circuit comprises:

a second transistor, a first end of the second transistor being coupled to a reference high voltage, a second end of the second transistor being coupled to a control end of the second transistor and the first node; and a third transistor, a first end of the third transistor being coupled to the reference high voltage, a second end of the third transistor being coupled to the second node, and a control end of the third transistor being coupled to the control end of the second transistor.

8. The control circuit according to claim 2, wherein the second detection circuit comprises:

a third switch, a first end of the third switch being coupled to the control pin, a control end of the third switch being coupled to the controller; and a sampling circuit, coupled to a second end of the third switch and the controller, wherein the third switch is turned on during the second non-light-emitting period to connect the sampling circuit to the control pin, and is turned off during the light-emitting period and the first non-light-emitting period, and wherein the sampling circuit receives the voltage value at the control pin during the second non-light-emitting period, and detects the current value flowing through the sensing resistor according to the voltage value at the control pin.

9. The control circuit according to claim 8, wherein the second detection circuit further comprises:

an amplifier, coupled between the second end of the third switch and the sampling circuit, configured to amplify the voltage value at the control pin during the second non-light-emitting period.

* * * * *